(12) United States Patent
Diekhans

(10) Patent No.: US 7,155,888 B2
(45) Date of Patent: Jan. 2, 2007

(54) AGRICULTURAL MACHINE WITH A GUIDANCE SYSTEM

(75) Inventor: Norbert Diekhans, Gütersloh (DE)

(73) Assignee: CLAAS Selbstfahrende GmbH (DE)

( * ) Notice: Subject to any disclaimer, the term of this patent is extended or adjusted under 35 U.S.C. 154(b) by 620 days.

(21) Appl. No.: 10/358,460

(22) Filed: Feb. 5, 2003

(65) Prior Publication Data
US 2003/0145571 A1 Aug. 7, 2003

(30) Foreign Application Priority Data
Feb. 5, 2002 (DE) .............................. 102 04 702

(51) Int. Cl.
A01D 41/14 (2006.01)
A01D 41/127 (2006.01)
A01D 46/08 (2006.01)

(52) U.S. Cl. .................................................. 56/10.2 R

(58) Field of Classification Search ............. 56/10.2 R, 56/10.2 F, 10.2 A, DIG. 7; 172/2, 3, 4, 4.5, 172/7; 294/82.1, 81.1; 701/50, 41
See application file for complete search history.

(56) References Cited

U.S. PATENT DOCUMENTS

| | | | | |
|---|---|---|---|---|
| 3,946,825 A | * | 3/1976 | Gail ............................ 180/401 |
| 4,868,752 A | * | 9/1989 | Fujii et al. ..................... 701/28 |
| 5,715,666 A | | 2/1998 | Huster et al. |
| 5,828,971 A | * | 10/1998 | Diekhans et al. ............. 701/41 |
| 5,911,669 A | * | 6/1999 | Stentz et al. ............... 56/10.2 F |
| 6,095,254 A | * | 8/2000 | Homburg ...................... 172/6 |
| 6,101,795 A | | 8/2000 | Diekhans |
| 6,244,024 B1 | * | 6/2001 | Diekhans et al. .......... 56/10.2 F |
| 6,389,785 B1 | * | 5/2002 | Diekhans et al. .......... 56/10.2 F |
| 6,397,569 B1 | * | 6/2002 | Homburg et al. ......... 56/10.2 F |
| 6,615,570 B1 | * | 9/2003 | Beck et al. ............... 56/10.2 E |

FOREIGN PATENT DOCUMENTS

| | | |
|---|---|---|
| DE | 195 08 942 | 9/1996 |
| DE | 197 19 939 | 11/1998 |
| DE | 197 26 917 | 1/1999 |

* cited by examiner

*Primary Examiner*—Árpád Fábián Kovács
(74) *Attorney, Agent, or Firm*—Husch & Eppenberger LLC; Robert C. Haldiman

(57) ABSTRACT

A self-propelled agricultural machine having a position-finding system including a position-finding device for detecting positions of guide variables relative to the machine and at least one adjusting device for adjusting the orientation of the region of coverage of the position-finding device relative to the machine. The position of the crop edge detected by the position-finding device is used for adjustment of the orientation of the region of coverage of the position-finding device relative to the machine. The position-finding system provides reliable control of the machine along the path of the crop edge. At least one adjusting device orientates the positioning-finding device relative to the machine for tracking the machine along the detected crop edge. In addition, the signals of a further position-finding device in a feed region of a cutterbar is taken into consideration.

24 Claims, 4 Drawing Sheets

AGRICULTURAL MACHINE WITH A GUIDANCE SYSTEM

TECHNICAL FIELD OF THE INVENTION

The invention relates generally to a self-propelled agricultural machine, and more specifically, a self-propelled agricultural machine having a contactlessly operating position-finding device and an adjusting device for adjusting the orientation of the position-finding device relative to the working machine.

DESCRIPTION OF THE RELATED ART

Self-propelled agricultural working machines having position-finding devices for relieving the pressure on the operators of the machines and for increasing the machine capacity in the working mode. This is achieved by the determination of a relative position of a transport vehicle, a working edge or guide variable in relation to the working vehicle and the systems for control or regulation of adjusting parameters or automatic tracking system which are dependent thereon. There are a few contactlessly operating position-finding devices known in the art. DE 195 08 942 A1 describes an agricultural machine having a reflex position-finding device. An ultrasound sensor is mounted on a cutterbar of a combine harvester above a grain edge and directed onto the latter looking ahead in the direction of travel. The ultrasound sensor determines the relative position of the grain edge to the cutterbar. An ultrasound pulse is emitted and widens like a beam in the direction of the grain edge and, with correct orientation, is reflected firstly on the ear surface and secondly on the stubble surface. Due to the difference in height which exists at the grain edge, the two echoes occur at the position-finding device with a time interval between them and are correspondingly converted to a relative position of the grain edge to the position-finding device or agricultural machine. The signal obtained is delivered to an automatic steering system on the agricultural machine, which automatically generates therefrom a steering angle at the steering axle in such a way that the agricultural machine follows the grain edge. The region around the grain edge, which is covered by the position-finding device, is defined by inter alia the directional characteristic and the scanning distance of the ultrasound sensor. The disadvantage to this system is that the maximum possible region of coverage is limited, so that greater variations in the path of the grain edge cannot be detected by this position-finding device and stable automatic steering can no longer be ensured. A further disadvantage arises due to the slow reaction of the agricultural machine to a steering movement. A variation in the relative position of the grain edge to the agricultural machine which is detected by the position-finding device is directly converted to a steering movement by the automatic steering system of the agricultural machine; but because of the mass inertia of the agricultural machine, there is a delayed, slow reaction of the change of direction of travel of the agricultural machine. Disadvantageously, the region of coverage of the position-finding device may no longer cover the grain edge, and automatic steering of the agricultural machine in a stable fashion is no longer possible.

DE 197 26 917 A1 describes a device on an agricultural machine for the contactless scanning of contours extending over the ground. A laser distance measuring device is mounted on the agricultural machine looking ahead in the direction of travel. A laser scanning beam sweeps in a scanning plane which is at an angle to the field to be cultivated to determine a contour of the field from the mounting position and the respective distance signals in conjunction with the sweep angle of the scanning beam. The sweeping of a laser scanning beam by means of a laser distance measuring device mounted on the agricultural machine so as to oscillate about a vertical swivel axis or by means of a movable swivel lens in a laser distance measuring device fixed to the agricultural machine is disclosed. The high scanning distance of the laser distance measuring device enables scanning of the contour over a large width in front of the agricultural machine, as well as early detection of variations in the path of a guide variable determined from the contour and delivered to a subsequent automatic tracking system. Due to this wide scanning of the contour, large deviations of the guide variable can be detected and in cases of slow reacting agricultural machines, the guide variable cannot depart from the scanning region. Due to early scanning, the agricultural machine can be oriented towards the guide variable, pointing forward; but as a result, loses the direct relationship to the instantaneous position of the guide variable relative to the feed region of the working components of the agricultural machine. There can, therefore, be insufficient load on a cutterbar or crop losses due to the feed region moving past the standing or lying crop. This is a disadvantage because the large region of coverage of the laser distance measuring device requires a high scanning speed of the laser beam, which also leads to the storage of a larger quantity of data and longer time to evaluate the data.

DE 197 19 939 A1 discloses a position-finding device on a steerable harvesting machine. The position-finding device points forward in the direction of travel, senses a guide variable (e.g., a grain edge), and in a distant forward position in the feed region of the working components of the agricultural machine. The subsequent steering regulator obtains a remote and proximate signal on the relative position of the guide variable to the harvesting machine, which causes the steering movement for reliable crop pick-up by early orientation of the harvesting machine along the guide variable. Following a greater variation in the guide variable, a greater steering movement is necessary, this is detected by the remote position-finding device, but advantageously restricted by the near scanning signal to avoid the remote scanning signal from losing the guide variable in the process. In addition, a coverage of the region transversely to the guide variable is required. This adversely increases the cost of the position-finding device for this remote scanning, requires a higher scan rate of the device and requires a longer time for data evaluation of the higher data quantity produced.

SUMMARY OF THE INVENTION

It is an aspect of the invention to provide an agricultural machine having a position-finding system for ensuring reliable detection of guide variables and eliminating the defects described above in the prior art.

In another aspect of the invention, there is a position-finding system for sensing a region of coverage containing the guide variable and wherein the position of the region of coverage relative to the agricultural working machine is variable and the variation is made as a function of the variation in the guide variable.

Advantageously, the position-finding device never loses the guide variable even in cases of greater variations in the path of the guide variable. The region of coverage of the position-finding device is separated from the movement of the working machine and remains oriented towards the guide variable. Further, the guide variable can be restricted to a small region. Furthermore, position-finding devices having a narrow region of coverage, such as the ultrasonic position-finding device described in the prior art, can be used. By using a narrow region of coverage, the position-finding devices yields, in connection with the proposed solution, the added advantages described below. The position-finding devices are less expensive as a result. This is achieved in particular by the possibility of using an ordinary swivel mechanism for the contactlessly operating scanning signal. Furthermore, position-finding devices of this kind can be orientated selectively towards a guide variable and are, therefore, not affected by any further guide variables existing in the area surrounding the guide variable or further existing contour changes which are detected as well. Further, there is the possibility of obtaining a higher scan rate with a comparably smaller data quantity. The reliability of detection of the guide variables is noticeably increased as a result. Advantageously, the position-finding device with a small region of coverage can first be swivelled automatically or manually over a region, by means of the adjusting device according to the present invention, for example to initialize the position-finding system or to automatically adapt to different working widths of the front attachments or implements or to find a guide variable, in order then to use the found or selected position of a guide variable relative to the working machine as the basic orientation or neutral position.

Due to the dimensions of the position-finding device, which are negligible compared with the whole working machine, adjustments of the relative orientation of the position-finding device on the working machine is possible with high dynamics. Direct panning of the position-finding device, on account of a change in the position of the guide variable relative to the working machine, can be performed advantageously without significant delay and deviation.

In a first embodiment of the invention, the region of coverage is formed by a scanning beam which sweeps in a plane between two region boundaries or by a beam which scans in planar fashion. With the scanning beam, a contour is scanned point-by-point by a distance measurement in conjunction with an interval measurement between emitted- and received signals. In the process, the contour is composed of individual points and then a guide variable and its relative position to the position-finding device are determined from the path of the contour. Particularly suitable for this is a laser beam which is swivelled about an axis in one plane. The coverage region is further formed by a beam which scans in planar fashion. This beam is, for example, formed by a sound beam of an ultrasound sensor. The propagation time of an acoustic wave and the intensity of the echo are here evaluated. The propagation time and the intensity of the echo are determined by the surface on which the acoustic wave is reflected. In particular, the intensity of the echo yields, in conjunction with a reference value, an evaluatable measure of the position of the guide variable relative to the position-finding device.

The effect is particularly advantageous for the durability of the adjusting device, if the region of coverage of the position-finding device is reoriented relative to the working machine by least one adjusting device only when the detected guide variable moves to the region boundary of the region of coverage of the position-finding device. As a result, it is advantageously ensured that the guide variable cannot depart from the region of coverage of the position-finding device while simultaneously adjusting the sequence of the adjusting device is limited.

The central region of coverage of the position-finding device is automatically oriented towards the guide variable by means of at least one adjusting device. As a result, detection of the subsequent variations in the path or the variation in the position of the guide variable is made possible on both sides of the guide variable by the same amount.

In a further embodiment of the invention, the position-finding device is mounted on the working machine so as to be swivellable relative to the working machine by means of at the least one adjusting device about at least one approximately vertical axis. As a result, adaptation of the orientation of the region of coverage of the position-finding device to a plurality of guide variables and working machines can inexpensively be obtained by an ordinary support with a vertical axis and an adjusting device engaging it. In particular, horizontal panning of the region of coverage of the position-finding device is necessary for reliable detection of the position of the guide variable, as scanning towards both sides of the guide variable is necessary for the detection thereof. Adjustment of the orientation of the position-finding device about a vertical axis yields easy detection of the orientation by inexpensive and well-known sensors. Also jackknifing of the working machine when moving along a slope to overcome the downhill drift is a problem for the position-finding system. The swivelling of the position-finding device away from the standing crop edge can be eliminated by manual or automatic control by fixed swivelling of the position-finding device about the vertical axis or swivelling in the opposite direction according to the inclination of the slope. In particular, various objects can also be achieved during tracking by the proposed position-finding system. If, for example, when plowing, the guide variable "furrow" occurs in alternate directions. The corresponding necessary orientation of the region of coverage can be accomplished without extra expenditure by simply swivelling the position-finding device to and from.

A versatile position-finding system is provided for the detection of different guide variables, (e.g., a standing crop edge, swath, furrow and/or an edge of a loading receptacle), and for a wide field of application on agricultural working machines or working vehicles. The individual guide variables are detected with the aid of an associated evaluation criterion, wherein a position-finding device, (e.g., a laser reflex position-finding device), is used for the detection of several guide variables and in different orientations and mountings on a working machine, and equipped with different evaluation methods for the detection of different guide variables.

In a further embodiment of the invention, the position of the guide variable relative to the position-finding device detected by the position-finding device, and/or the orientation of the position-finding device relative to the working machine, is taken into consideration when adjusting at least one parameter of the working machine. Due to this evaluation of the detected guide variable, the absolute position of the guide variable relative to the working machine can be determined at any time and used for adjustment of the working machine. In particular, during automatic panning of the position-finding device, on account of a change in position of the guide variable on the working machine, a certain adjusting time is needed by the adjusting device. By the addition of the individual orientations (i.e., guide variable to position-finding device, position-finding device to working machine), the absolute position can be determined during adjustment. This embodiment of the invention is particularly advantageous if the region of coverage is reoriented centrally towards the guide variable only when the guide variable has reached the region boundary. In this case, adjustment of the working machine, which is dependent on the guide variable, can be carried out with high precision.

In another embodiment of the invention, the orientation of the position-finding device, (i.e., vertical angle a and d), relative to the working machine is used for automatic tracking of the working machine. Use of the position-finding system produces an enormous relief of pressure on the operators of the working machine and obtains a higher load on the cutterbar and hence also on the combine harvester itself (when used on a cutterbar of a combine harvester). Advantageously, the whole region of coverage of the position-finding device is permanently available for tracking irrespective of the instantaneous orientation of the working machine to the guide variable. Detection of the guide variable is, thus, made possible at any time at low cost.

In order to obtain exact evaluation of the position of the guide variable relative to the working machine, the position of the guide variable relative to the position-finding device which is detected by the position-finding device, is used for automatic tracking of the working machine. Advantageously and as a result, even smaller variations in the path of the guide variable which do not lead to adjustment of the position-finding device relative to the working machine are taken into consideration during tracking as well. Also the existing reaction and adjusting times for panning of the position-finding device, particularly with larger deviations of the guide variable, do not cause delayed detection and reaction by the subsequent tracking system.

In a further embodiment of the invention, the orientation of the working machine relative to the guide variable in the feed region of the working machine is detected by at least one further position-finding device, and considered during automatic tracking. As a result, coordination of the current orientation of the working machine at the guide variable in conjunction with the future path of the guide variable ahead is ensured, so that improved tracking can be achieved. Additional detection of the guide variable by a further position-finding device ensures that, during automatic tracking of the working machine, the feed components in the immediate region of feeding are sufficiently loaded with the crop and, furthermore, no crop losses are caused in the process.

In a further embodiment of the invention, the orientation of the position-finding device, (i.e., angle a, and d), relative to the working machine is taken into consideration during automatic control of at least one adjusting variable of a transfer chute on a working machine (e.g., the direction of transfer). The guide variable detected is, for example, a vertical edge of a loading receptacle and indicates the position of a working vehicle relative to the working machine. The direction of transfer of the transfer chute can be controlled automatically from the measured position of the transport vehicle. From the sensed region of coverage, the distance can be determined and the transfer distance of the transfer chute can be controlled automatically. This use provides relief of pressure on the operators and facilitates detection and following of different transport receptacles.

Furthermore, the relative orientation of the position-finding device, (i.e., the angle a, and d), relative to the working machine can be used for automatic coordination of a working vehicle. In particular during the transfer of crop to a parallel-moving working vehicle, coordination can be carried out by reliable and early detection of the path of the guide variable in the form of a crop edge or crop swath and detection of the loading receptacle.

The position-finding device is equipped with a navigation device. As a result, the absolute position of the position-finding device in a field to be cultivated can be determined. The position of the guide variable detected by the position-finding system can be determined ahead relative to the position of the position-finding device and stored for further use, (e.g., in a map of the field).

In a further embodiment of the invention, the position of the guide variable relative to the position-finding device, which is detected by the position-finding device, and the orientation of the position-finding device relative to the working machine, in conjunction with the position of the position-finding device determined by the navigation device, is used in at least one device for planning and/or control along a route for the working machine and/or a working vehicle. By connecting the position of the guide variable relative to a navigated position in the field, which is determined by the position-finding system, the path of the guide variable can be evaluated backwards from the current detected position in the direction opposite the direction of travel of the working machine with the aid of recorded absolute positions. Therefore, a comparison of the absolute position can be made with the aid of the recorded guide variables and the current position of the position-finding device in the feed region for detection of the current load. Furthermore, the detected path of the guide variable allows planning of a route for the working machine and automatic tracking with the aid of the planned and current positions of the working machine in the field. Also, dependent planning ahead of the route followed by automatic tracking for a parallel-moving working vehicle can be carried out.

In a particular embodiment of the invention, the reference orientation of the region of coverage of the position-finding device is predetermined in dependent fashion by at least one adjustment of the working machine. This reference orientation constitutes a neutral position of the orientation of the position-finding device on the working machine which then serves as a reference value for determining the deviation for a use which is dependent on the orientation of the region of coverage and on the position of the guide variable relative to the working machine. Further, a preliminary adjustment of the orientation of the region of coverage relative to the working machine becomes possible. Thus, the position-finding device can, for example, be preset to a certain angle of inclination to the standing crop as a function of a preselected cutting height of the cutterbar. Further, for example, the orientation of the position-finding device can be preset for scanning a loading receptacle by the intended direction of transfer with the aid of adjustment of the transfer chute. This yields the advantage that when change of direction of transfer (e.g., from left to right), during swivelling of the transfer chute, the region of coverage of the position-finding device too is set to the approximate expected new position of the guide variable relative to the working machine. This can be effected by superimposing an offset on an absolute basic setting of the sensor signal which determines the position of the position-finding device relative to the working machine. The control system of the adjusting device then controls the resulting deviation without evaluating or taking into account the guide variables in the region of coverage detected in the process by the position-finding device. So-called learning of the reference orientation also proved to be advantageous. For this purpose, the region of coverage of the position-finding device is oriented towards the guide variable manually or in a start or initialization step and the orientation relative to the working machine which then exists is used as the reference orientation. For automatic tracking, the reference orientation is, as a rule, when the orientation of the region of coverage is inclined towards the standing crop edge, above the latter in the direction of travel, preselected with orientation in the direction of travel or perpendicular thereto.

The use of a position-finding device is versatile and inexpensive when used on different agricultural working machines or used on one working machine, respectively. In a particular embodiment of the invention, the region of coverage of the position-finding device in conjunction with the guide variable to be located can be adapted to the latter. This makes it possible to detect different guide variables from a scanned contour, due to a varying scanning width depending on the guide variable. Detection of the center of a swath as the guide variable requires coverage across the whole width of the swath cross-section. A working edge, on the other hand, can be reliably detected in a smaller region of coverage. Adaptation allows a limited data quantity produced, determined as a function of the detected guide variable. A working edge or loading receptacle edge being aimed is determined by a sudden change of distance in the scanned contour. By adaptation or restriction of the scanning distance performed in certain regions, other guide variables which are adjacent but further away can be cut out and as a result reliable detection of the desired guide variable can be enabled.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
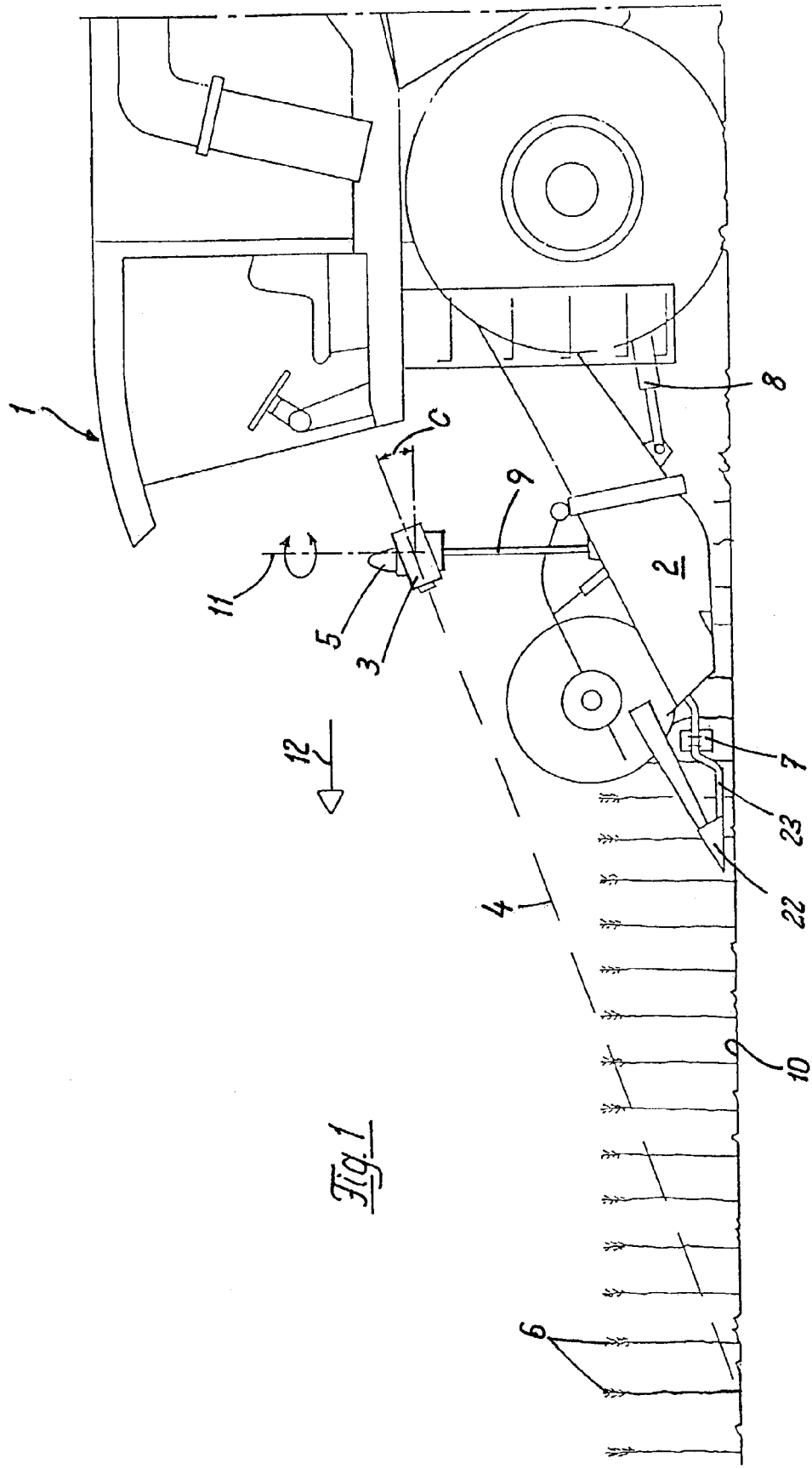
FIG. 1 is a side view of a combine harvester with a position-finding device mounted on a cutterbar.

FIG. 1 shows a combine harvester 1 having a cutterbar 2 mounted thereon so as to be vertically movable and swivellable about a horizontal axis by means of a lifting cylinder 8. The combine harvester 1 has a position-finding device 3 attached thereto. The position-finding device 3 is mounted above a grain edge on a supporting tube 9 so as to be automatically swivellable about at least one vertical swivel axis 11 relative to the supporting tube 9 and the combine harvester 1, wherein this swivel angle can rotate 360°. The position-finding device 3, which is inclined at in angle c to standing crop 6 ahead in the direction of travel 12, senses by means of a scanning beam 4 the distance between the position-finding device 3 and the standing crop 6 and field 10. In particular, this distance is determined by means of interval measurement between transmitted and received radar, sound or light pulse.

In FIG. 1, a laser reflex position-finding device is shown as the position-finding device 3. The latter is mounted so as to be swivellable about the axis 11 vertically relative to the supporting tube 9. The maximum possible swivel angle about the vertical axis 11, which can be produced by an adjusting device, (not shown), can be up to 360°. In the position-finding device 3 itself, there is a moving deflection device which moves the scanning beam 4 to and from, oscillating in a horizontal plane about an approximately vertical axis relative to the position-finding device 3. In the process, the scanning beam 4 scans the contour of a standing crop 6 or of the field 10 being cultivated in the instantaneous region of coverage. The contour is determined from the distance signals in conjunction with the relative orientation of the scanning beam 4 in relation to the working machine, wherein this orientation is calculated with the aid of the relative orientation of the position-finding device 3 with respect to the supporting tube 9 and from the relative orientation of the scanning beam 4 with respect to the position-finding device 3. The maximum possible swivel angle about the vertical axis 11 is traversed only when no guide variable can be detected within the contour scanned by the scanning beam 4. For instance, first the scanning beam 4 is swivelled through about 15° relative to the position-finding device 3 and at the same time the individual scanning distances are evaluated in connected fashion as a contour. Sudden changes of distance or extreme values such as depths or heights in the contour are detected as a guide variable. Here the respective use predetermines the evaluation (i.e., what corresponding characteristic of the guide variable in the contour is being sought). If no guide variable is detected in the scanned contour, the position-finding device 3 is swivelled about the vertical axis 11 by means of the adjusting device and the contour in this region is scanned again. This process is repeated until a guide variable is detected by the position-finding device 3. Swivelling of the position-finding device 3 about the vertical axis 11 can be effected automatically or manually. Advantageously, this operation is performed while stationary when the position of the working machine or combine harvester 1 relative to the guide variable is correct. The position-finding device 3 is then in an initialization step oriented with the region of coverage towards the guide variable in such a way that the guide variable is detected in the central region of the region of coverage. The orientation of the position-finding device 3 relative to the combine harvester 1 which arises is then used as the basic orientation, for example as a nominal value, for an automatic steering device on the combine harvester 1.

The laser reflex position-finding device used may further be a position-finding device 3 which works with the laser scanning beam 4 which is fixed relative to the position-finding device 3. In the start or initialization step, the position-finding device 3 is then swivelled by the adjusting device about the vertical axis 11 through a larger angle (e.g., 360°). The distance values detected in the process are regarded coherently as the contour and evaluated according to the desired characteristic of the guide variable. If a guide variable such as a furrow, standing crop edge or swath is detected in the scanned contour, the position of the guide variable is stored as the basic orientation and the scanning beam 4 is moved in oscillating fashion with a small angle about the basic orientation, (i.e., the guide variable and the adjoining region are scanned constantly).

A laser reflex position-finding device which swivels a scanning beam 4 through a large angle, up to 360°, can also be used. If a guide variable is detected as described above, the scanned region is restricted to a few degrees (e.g., 15°), and the position-finding device 3 is then oriented towards the guide variable by means of the adjusting device.

An ultrasonic position-finding device can also be used as the position-finding device 3. Here, the position-finding device 3 is mounted on the supporting tube 9 with its sound beam oriented from above directed down onto the standing crop edge. In an initialization step, the basic orientation is oriented in such a way that the echo signal sensed in the process roughly corresponds to half an echo signal which occurs when the sound beam is fully oriented towards the standing crop.

Irrespective of the position-finding device 3 used or the start or initialization step, during the working mode of the combine harvester 1, an altered position of the guide variable relative to the combine harvester 1 or of the combine harvester 1 relative to the guide variable causes panning of the region of coverage of the position-finding device 3 by means of the adjusting device, wherein the scanning beam 4 or the sound beam always scans the regions adjacent to the guide variable in roughly equal proportions. The altered orientation of the position-finding device 3 relative to the combine harvester 1 which arises is detected by a sensor mechanism and delivered to a subsequent device, for example the automatic tracking system, as the actual signal. With the aid of the reference orientation, by the device for tracking, a deviation is determined and a corresponding adjusting signal is generated for adjusting the steered wheels. As a result, the direction of travel 12 of the combine harvester 1 is affected in such a way that the combine harvester 1 follows the altered path of the standing crop edge. Due to the change in direction of travel 12 of the combine harvester 1, the region of coverage of the position-finding device 3 is moved relative to the crop edge. The orientation of the position-finding device 3 is adjusted by the position-finding system in the direction of the reference orientation, so that at the same time there is a reduction of the deviation. The deviation then becomes zero when the position-finding device 3 detects the crop edge again with the previously, determined reference orientation to the combine harvester 1.

The position-finding device 3 can also be attached to the supporting tube 9 so as to be swivellable about a horizontal axis. This possibility serves for a single adjustment of the position-finding device 3 on the supporting tube 9 with respect to the inclination at the cutterbar 2 towards the crop 6. Further, this possible adjustment can also be performed under remote control by an adjusting device automatically, to maintain a constant distance, for example from the field 10. This horizontal adjustment function can be used particularly for adaptation of the orientation of the position-finding device 3 to different crop heights and/or cutting heights of the cutterbar 2. Further, it is particularly advantageous to adjust the forward position of the position-finding device 3 to different speeds of travel, by different inclinations, to compensate for undulating paths along the crop edge or to stabilise the steering control circuit. A higher speed of travel then causes the position-finding device 3 to point further ahead.

On the cutterbar 2 in the feed region is mounted a further position-finding device 7, oriented transversely to the direction of travel 12 of the combine harvester 1. This position-finding device 7 determines the load on the cutterbar 2 with reference to the distance between the holding arm 23 of the crop divider 22 moving past the crop 6, of the position-finding device 3. A navigation aerial 5 is mounted on top of the position-finding device 3. The latter determines the absolute position of the position-finding device 3 in the field 10. The positions of the guide variable relative to the cutterbar 2, which are determined by the position-finding devices 3, 7, can be coordinated with the absolute position of the position-finding device 3 and, if occasion arises, filed in a memory device (not shown). The path of the guide variable can then be recorded relative to the field 10, used for direct tracking of the combine harvester 1 and further serve as the basis of subsequent tracked movement of the same or another working machine along a crop edge. The navigation aerial 5 can also be mounted on the combine harvester 1 at a distance from the position-finding device 3 and deliver, for example, the position data for tracking and/or yield mapping of the combine harvester 1.

Figure 2:
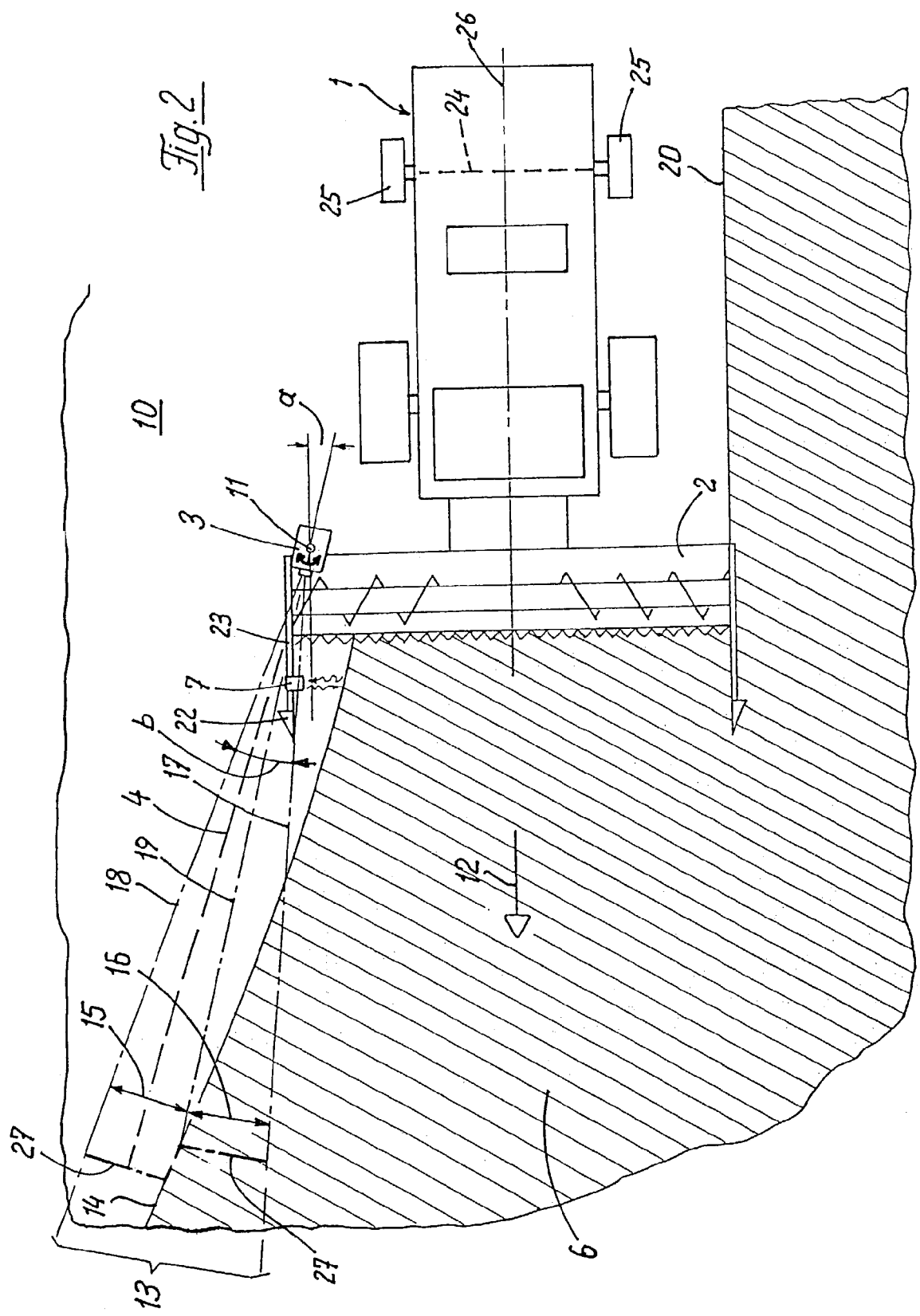
FIG. 2 is a top view of the combine harvester according to FIG. 1 which is in use.

FIG. 2 shows a top view of the combine harvester 1 having the position-finding device 3 in working use. As it travels in the direction of travel 12 over the field 10, the cutterbar 2 cuts grain from the field 10 over a width determined thereby. In the process, the existing crop edge 14 is shifted parallel transversely to the direction of travel 12 by the actual working width of the cutterbar 2 to a new working edge 20. The new working edge 20 is the standard for a new crop edge for tracking of the combine harvester following behind or when the combine harvester 1 travels along side. Here, it is the function of the operator of the combine harvester 1 to deliver the cutterbar 2 along the existing crop edge 14 with a maximum possible load and without the crop remaining standing in the process. Automatic steering systems on combine harvester 1 have proved to be particularly effective for this. The latter detects the crop edge 14 ahead by means of the position-finding device 3. A subsequent steering regulator detects the position-finding signal generated and (an electrohydraulic steering device) steers the steered wheels 25 via a steering axle 24 of the combine harvester 1 in such a way that the deviation detected by the position-finding device 3 is controlled. It is advantageous to measure the load on the cutterbar 2 via the position-finding device 7 mounted in the feed region as the actual load on the cutterbar 2. As a result, the path of the crop edge 14 ahead referred to the direction of travel 12 of the combine harvester 1 can be sensed at two locations at a distance from each other. In conjunction with the actual load on the cutterbar 2 and an absolute position of the cutterbar 2 determined by the navigation device 5, the crop edge 14 and the new working edge 20 (transverse to the direction of travel 12) can be assigned absolute coordinates.

The position-finding device 3 is mounted on the right cutterbar wall above the standing crop edge 14 at an angle to the standing crop edge 14. In the crop edge 14, 20 shown, a variation in the path which must result in a change-over from driving straight on to turning of the combine harvester 1 is shown. The position-finding device 3 has been swivelled by the adjusting device at an angle a to the longitudinal axis 26 in the direction of travel 12 of the combine harvester 1 about the vertical axis 11 towards the crop edge 14, wherein at the steering regulator this angle a occurs as a deviation, but the steered wheels 25 do not yet show a change in direction of travel for following the imminent turn. The steering regulator can be designed in such a way that a movement of the steered wheels 25 as is allowed only when the position-finding device 7 indicates the observance of load limits which might be exceeded on account of the intended necessary steering movement.

A region of coverage 13 of the position-finding device 3 has been swivelled with the central region of coverage 19 towards the crop edge 14. The scanning beam 4 scans a point on the stubble and in this case is in the stubble scan region 15. This region 15 is located between the right region boundary 18 and the center of the region of coverage 19. The ear scan region 16 is located between the center of the region 19 and the left region boundary 17. The two regions 15, 16 together produce, seen in one plane, the region of coverage 13 of the position-finding device 3. By the position-finding device 3, the stubble scan region 15 is detected from an ear scan region 16 by different distances. The contour 27 scanned over the aperture angle b has, in the region of coverage 13 of the position-finding device 3, a greater distance in the stubble scan region 15 than in the ear scan region 16. The guide variable "crop edge 14" is detected by the position-finding device 3 with reference to the sudden change of the distance signal between the regions 15, 16 and followed by the position-finding system. The absolute distance as well as the difference in the distances with respect to the two scan regions 15, 16 have no effect on determination of the position of the guide variable 14.

Figure 3:
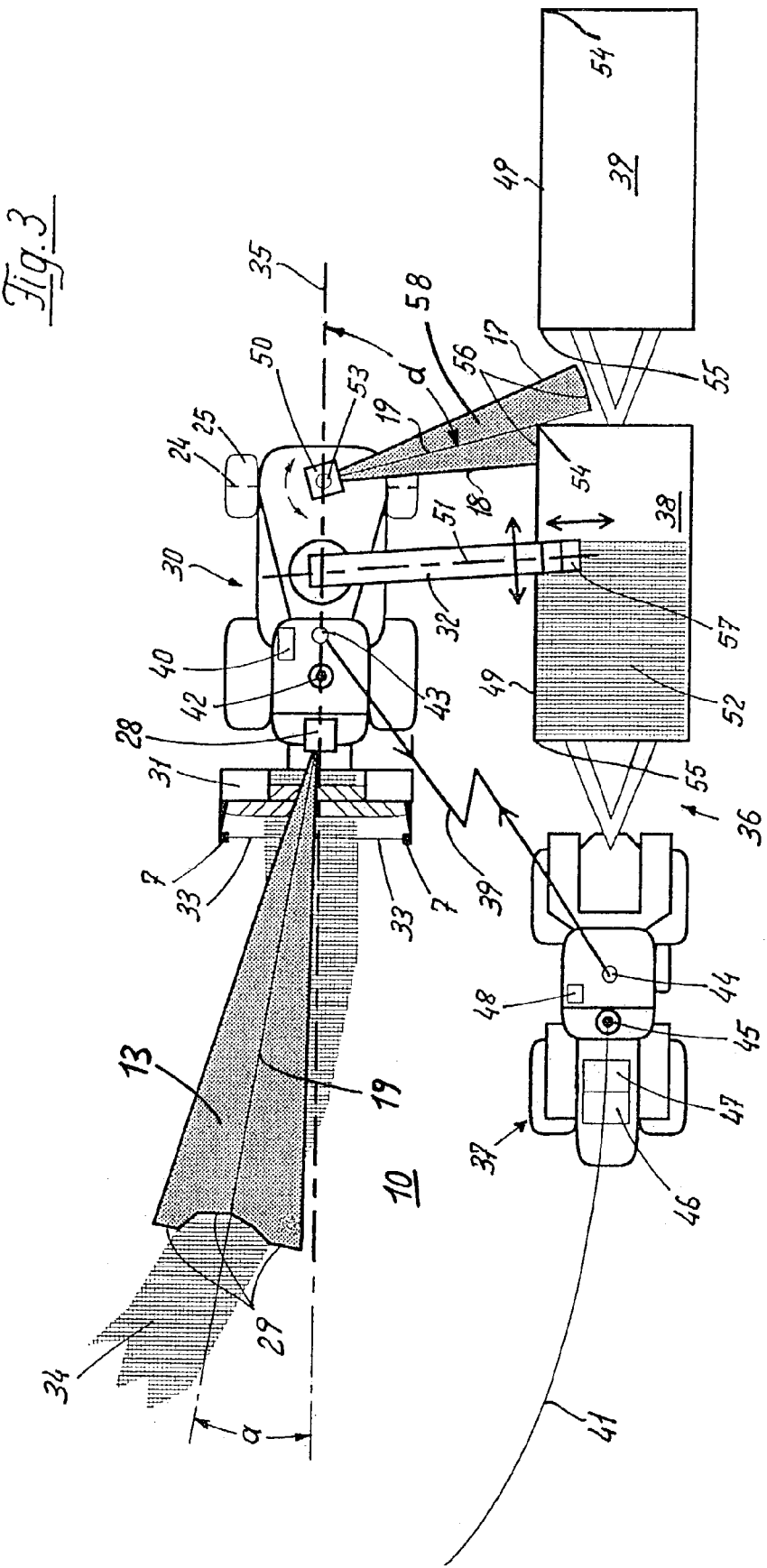
FIG. 3 is a top view of a forage harvester with two position-finding devices mounted thereon and a parallel-moving transport vehicle.

FIG. 3 shows a top view of a forage harvester 30 with two position-finding systems and two associated position-finding devices 28, 50 mounted thereon and a parallel-moving transport vehicle 36 adjacent the forage harvester 30. The forage harvester 30 picks up crop lying in swaths 34 on the field 10 with the pick-up 31 in the direction of travel, processes it and then transfers it via a transfer chute 32 to a loading receptacle 38, 39 towed by the towing vehicle 37. The distance between the position-finding device 28 and the swath 34 is scanned ahead contactlessly by the position-finding device 28 arranged on a longitudinal axis 35 of the forage harvester 30 and fixed to the driver's cab thereof, via a scanning beam moving in oscillating fashion in a region of coverage 13. With the aid of the measured contour 29, the guide variable is detected by determining the shortest distance between the swath 34 and the position-finding device 28, and the region of coverage 13 of the position-finding device 28 is swivelled by the adjusting device mounted inside the housing of the position-finding device 28 in such a way that the guide variable is detected in the central region of coverage 19 of the position-finding device 28. The quantity of the angle a occurring in the process between the longitudinal axis 35 of the forage harvester 30 and the center region of coverage 19 of the region of coverage 13 is delivered to an automatic steering device and used by it for tracking of the forage harvester 30.

On the pick-up 31 shown in FIG. 3, two position-finding devices 7 are mounted on both sides in the feed region and oriented transversely to the working direction. Generally, the position-finding device 7 sense the distance from the swath 34 at a given height each with a scanning beam 33 to the swath 34 picked up centrally by the pick-up 31. These distances show the position of the swath 34 in the feed region of the pick-up 31. The spaced-apart positions of the swath 34 determined by the position-finding devices 7, 28, in relation to the forage harvester 30, can be delivered to an automatic steering device which is present on the forage harvester 30 for automatically and controlling the following swath 34. In this case, the position-finding device 28 is used for finding the position of the swath 34 ahead, and the position-finding device 7 is used for position finding nearby.

On the roof of the forage harvester 30, a navigation aerial 42 is operatively mounted. The absolute position of the forage harvester 30 in relation to the field 10 can be determined by this means. The individual positions indicate the track of the forage harvester 30 in the path and can be stored in a memory. The positions of the swath 34 detected by the position-finding device 28, 7 can be stored in association with the navigated positions of the forage harvester 30. From the known distance between the navigation aerial 42 and the position-finding device 30 on the forage harvester 30, the absolute orientation of the longitudinal axis 35 referred to the field 10, the angle a and the distance between the contour 29 and the position-finding device 28, the absolute position of the swath 34 can be determined ahead of time. Advantageous tracking of the forage harvester 30 with reference to the recorded absolute position of the swath 34 in conjunction with the current navigated position of the forage harvester 30 in the field 10 can be carried out by this means. Also, the position of the swath 34 in the feed region of the pick-up 31 of the forage harvester 30 can be calculated with respect to the navigated position of the forage harvester 30 and used directly for tracking or filed in a memory device for this purpose.

A route planning system 40 is installed on the forage harvester 36. The route planning system 40 can produce a route for the forage harvester 30 and also take over control of the route 41 for the transport vehicle 36. The towing vehicle 37 is equipped with a forward-travel control system 46 and a steering control system 47 for this purpose. These control systems 46, 47 are connected to the route planning system 40 via a data transmission path 39. For this purpose, the forage harvester 30 and the towing vehicle 37 each have a radio transmitting and receiving device as well as associated radio aerials 43, 44. From the measured absolute position of the swath 34, a steering angle and a speed of travel for the towing vehicle 37 are determined by the route planning system 40 and transmitted to the control systems 46, 47 in such a way that reliable transfer of crop to the loading receptacles 38, 39 can be effected. A navigation aerial 44 is operatively mounted on the towing vehicle 37 for determining the absolute position in the field 10 Further, the route 41 for the transport vehicle 36 can be predetermined by the route planning system 40 by the transmission of an absolute route 41 in relation to the field 10. Tracking of the transport vehicle 36 along the swath 34 in conjunction with the position of the forage harvester 30 can also be performed automatically by a device on the towing vehicle 37. The current position of the forage harvester 30 and the measured position of the swath 34 are then transmitted to the towing vehicle 37 for this purpose. The operator of the towing vehicle 37 can operate the automatic tracking of the transport vehicle 36 or at least monitor it via an operative device 48.

FIG. 3 shows a forage harvester 30 having a further position-finding device 50 for detecting a relative position of the loading receptacle 38, 39 in relation to the forage harvester 30 operatively attached thereto. This position-finding device 50 is mounted in the rear region so as to be swivellable about a vertical axis 53 on the longitudinal axis 35 of the forage harvester 30. The region of coverage 13 of this position-finding device 50 can, therefore, be swivelled (approximately 360°) by an adjusting device to find and follow a guide variable. As a result, guide variables can be sensed to the left and right alongside or behind the forage harvester 30. A position-finding device 50 designed as a laser reflex position-finding device is used, the region of coverage 58 being shown oriented towards a vertical rear edge 54 of a loading receptacle. By a laser beam which sweeps in oscillating fashion in one plane, with different sweep angles relative to the position-finding device 50, distance values are determined from the propagation time of transmitted and received laser pulses between the position-finding device 50 and the scanned contour 56 in conjunction with the sweep angle. If a loading receptacle edge 54, 55 is located in the region of coverage 58, it is detected by the position-finding device 50 with the aid of a sudden change in distance in the scanned contour 56 and defined as a guide variable. The position-finding system orients the position-finding device 50 via the adjusting device on the forage harvester 30 in such a way that the detected loading receptacle edge 54, 55 is detected in the central region of coverage 19 of the region of coverage 58 of the position-finding device 3. The position of the guide variable 54 detected by the position-finding system is used to control the adjustment of the transfer chute 32. The transfer chute 32 can be swivelled about a vertical axis of rotation under remote control by the operator of the forage harvester 30, so that different angles can be set between the longitudinal axis 35 of the forage harvester 30 and the longitudinal axis 51 of the transfer chute 32. Thus transfer of crop to loading receptacles 38, 39 which are located to the right or left alongside or behind the forage harvester 30 can be effected. The relative orientation of the position-finding device 50 on the forage harvester 30, in particular the angle d, is used for adjustment of the orientation of the longitudinal axis 51 of the transfer chute 32 relative to the longitudinal axis 51 of the forage harvester 30, which is defined as the neutral position, for automatic control of the transfer chute 32.

At least one transfer flap 57 on the crop-discharging side of the transfer chute 32, is mounted which can be pivoted under remote control about an approximately horizontal axis located transversely to the longitudinal axis 51. By this means, the relative direction of discharge of the crop and the transfer distance in the direction of the longitudinal axis 51 can be controlled. From the relative position of the loading receptacle edge 54, 55 towards the forage harvester 30, which is detected by the position-finding device 50, can be determined. For example, with the aid of the distance signal existing at the right region boundary 18, the distance between the forage harvester 30 and the loading receptacle wall 49 can be determined. This distance is used for control of the transfer flap 57. If the transport vehicle 36 now moves relative to the forage harvester 30 in the field 10, the setting of the transfer chute 32 is varied according to the movement in such a way that the crop is transferred approximately to the same location in the loading receptacle 38, 39.

The respective setting of the transfer chute 32 is detected by sensors and is related to the signals of the position-finding device 50 in a device. This device can further be connected to the operating elements for manual control of the transfer chute 32 and further also deliver adjusting signals for adjustment of the position-finding system. Thus, for example, the region of coverage 58 of the position-finding device 50 at the commencement of automatic control in an initialization step is automatically oriented, in conjunction with the direction of transfer selected by the operator, parallel to the longitudinal axis 51 of the transfer chute 32. Next, the position-finding system seeks a loading receptacle edge 54, 55 with reference to the scanned contour 56, by the adjusting device adjusting the angle d over a larger region until the required sudden change of distance in the contour 56 is detected. Then, the angle d which occurs in the process and the measured distance are assigned to the current setting of the transfer chute 32 as the basic orientation, and automatic control of the transfer chute 32 which is dependent thereon, is started, wherein the region of coverage 58 of the position-finding device 50 is panned by means of an adjusting device for the loading receptacle edge 54, 55. Automatic control now automatically compensates for the relative movements between the forage harvester 30 and the transport vehicle 36, wherein manually generated oversteering of the setting of the transfer chute 32, for example by the operator, interrupts automatic control only during manual adjustment and automatically changes the new setting of the transfer chute 32 to a corrected new basic orientation, and then the procedure continues.

The position-finding system can detect, from the individual distance values and in particular from the values at the region boundaries 17 and 18, whether the loading receptacle edge 54, 55 found is a rear loading receptacle edge 54 or a front loading receptacle edge 55. In the orientation shown for the region of coverage 58, a rear loading receptacle edge 54 is detected by the shorter distance signal at the right region boundary 18 compared with the distance signal at the left region boundary 17. The loading receptacle 38 shown is already partially filled with crop 52 in the front region, so that further filling can be continued only in the rear part of the loading receptacle 38. It turned out to be particularly advantageous to aim for a front loading receptacle edge 55 when filling the front region of the loading receptacle 38, 39, and the rear loading receptacle edge 54 when filling in the rear part of the loading receptacle 38, 39. A change can be controlled manually by an operator, activated or performed automatically as a function of the angle d as well. If, for example, the position-finding device 50 comes into the vicinity of an adjusting stop when following the front loading receptacle edge 55, control of the transfer chute 32 is automatically interrupted, a rear loading receptacle edge 54 is sought, the new basic orientation of the position-finding device 50 between the loading receptacle edge 54 and the setting of the transfer chute 32 is allocated in corrected form, and automatic control is resumed.

During the search for a loading receptacle 38, 39 or a loading receptacle edge 54, 55, the scanning distance or also the width of the region of coverage 58 can be varied in order initially by scanning a larger region to achieve rapid finding of a loading receptacle 38, 39 or a loading receptacle edge 54, 55. After a loading receptacle 38, 39 or a loading receptacle edge 54, 55 has been found, the region of coverage can be restricted to match the position according to the invention and panned accordingly. This adaptation is advantageously made adaptively.

The position-finding device 50 and/or the guide variable to be detected can be connected to a navigation aerial 42. With reference to the current position 45 of the transport vehicle 36, the absolute position of the guide variable, in particular the approximate position of a loading receptacle edge 54, 55, can then be determined, and hence more rapid finding of the guide variable by the position-finding system can be brought about by a definite search region.

Combining the individual aforementioned practical examples can be made to arrive at further advantageous embodiments of the invention. Thus, for example, from the combination of the position-finding system for tracking with the position-finding system for transfer chute control can be derived further solutions for generating a route 41 for a working machine and/or a working vehicle 36 or for control of a transfer chute 32. Also, the inclusion of a navigated position of the position-finding device 3, 7, 28, 50 can be performed.

Figure 4:
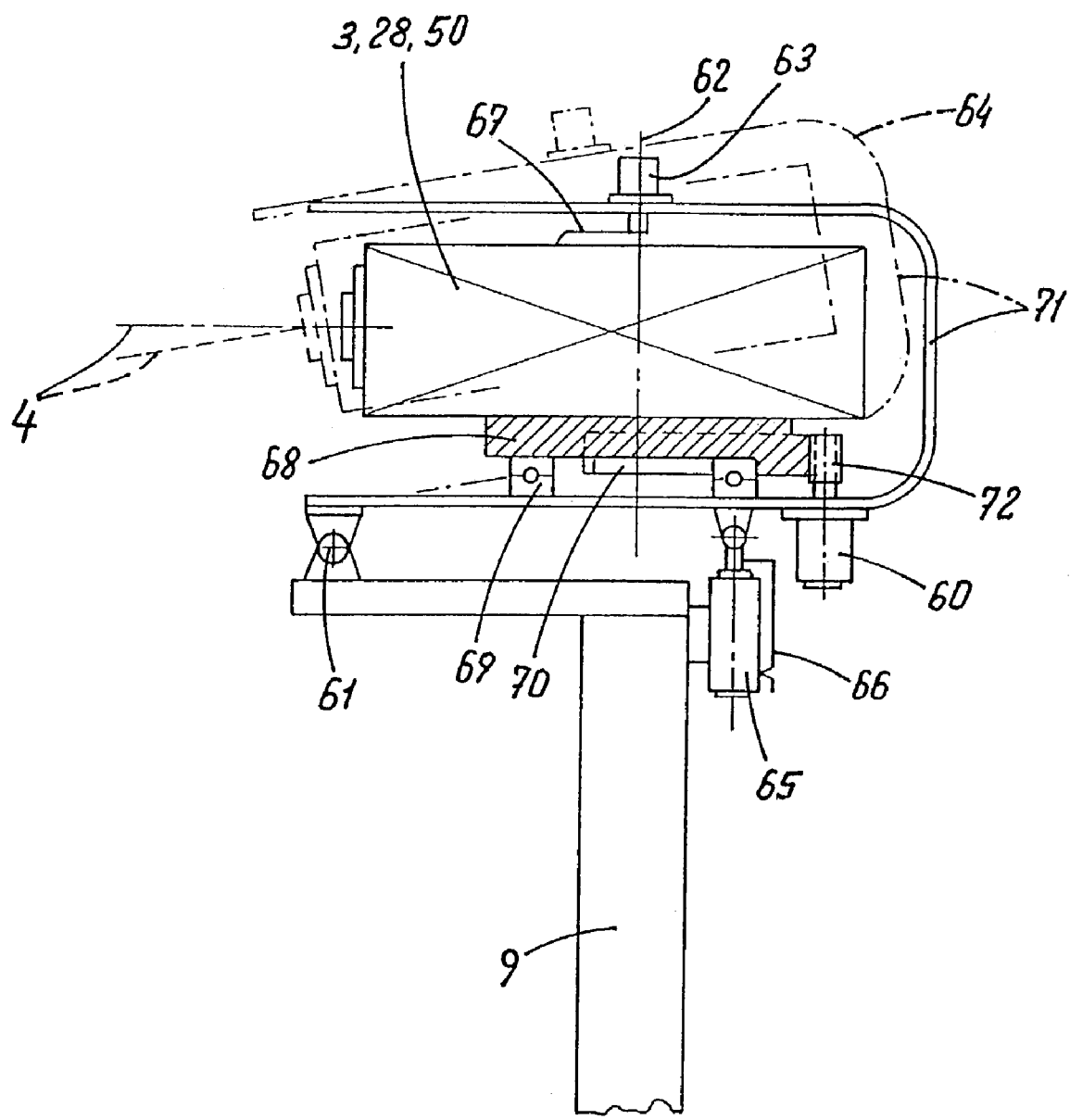
FIG. 4 is a side view of a position-finding device which can be swivelled about vertical and horizontal axes on a supporting pipe or pivoted left and right and pivoted up and down.

FIG. 4 shows a side view of a position-finding device 3, 28, 50 which can be swivelled on a supporting tube 9 about a vertical axis 62 and horizontal axis 61. The position-finding device 3, 28, 50 is mounted on a planetary gear 68 and a mounting 69 is arranged coaxially with the vertical axis 62 within a protective housing 71. The planetary gear 68 has circumferentially, at least in a certain region, a mounted tooth system 70 in which engages a gear 72 driven by a servo motor 60. The servo motor 60 is coupled to the protective housing 71 and allows remotely controlled swivelling of the position-finding device 3, 28, 50 about the vertical axis 62 relative to the protective housing 71 or the supporting tube 9. Due to this swivel drive 60, 68, 69, 70, 72, the region of coverage 13, 58 of the position-finding device 3, 28, 50 can track a guide variable 14, 34, 54, 55. In the protective housing 71 is mounted, held by the protective housing 71 and oriented axially to the vertical axis 62, a sensor 63 which by means of a lever 67 detects swivelling of the position-finding device 3, 28, 50 relative to the supporting tube 9. Coupled to the supporting tube 9 is a further servo motor 65 by means of which the entire protective housing 71 can be swivelled about the horizontal axis 61. As a result, adjustment of the inclination of the scanning beam 4 for example towards a standing crop edge 14 or adaptation of a travelling speed-related adjustment of the scanning distance becomes possible. An altered angle of inclination is indicated by the representation in dot and dash lines 64. The relative orientation of the position-finding device 3, 28, 50 is detected by a position sensor 66 which determines the adjusting path of the servo motor 65.

Control of the servo motors 60, 65 and evaluation of the sensor signals of the sensors 63, 66 is performed by devices, (not shown) arranged within the position-finding device 3, 28, 50. Further, the axes 61, 63 can also be arranged within the position-finding device 3, 28, 50 and the region of coverage 13, 58 of the position-finding device 3, 28, 50 can follow the guide variable 14, 34, 54, 55 by adjusting devices which are present there.

The practical examples described show particularly advantageous applications of the position-finding system according to the invention; however, the invention is not meant to be confined to these. The position-finding system can be used on known agricultural working machines. For example, a tractor, a working vehicle or a towing vehicle 37 for finding the position of and/or automatically following a guide variable, such as a standing crop edge 14, 20, a track produced by a track marker, a swath 34, a plow furrow, a driving lane or some other kind of working edge. Further, the position-finding system can also be used on a cultivation implement, for example, a plow, and used for adjustment of the cultivation implement and/or for tracking of the cultivation implement and/or of the corresponding towing vehicle 37.

What is claimed is:

1. A position-finding system for an agricultural machine comprising:
    at least one position-finding device, said device being contactlessly operable to sense a guide variable within a preconfigured region of coverage;
    at least one adjustment device, said adjustment device being operable to move said position-finding device relative to the agricultural machine such that said region of coverage moves relative to the agricultural machine and said at least one adjustment device being in operative communication with said at least one position-finding device;
    wherein said adjustment device moves said position-finding device according to a communication of a change in said guide variable within said region of coverage.

2. The position-finding system of claim 1 wherein said change in said guide variable is a change in a position of said guide variable in said region of coverage.

3. The position-finding system of claim 1 wherein said movement of said position-finding device is pre-selected.

4. The position-finding system of claim 1 wherein said movement of said position-finding device is controlled by a processor in operative communication with said position-finding device and with said adjustment device.

5. The position-finding system of claim 1 wherein the regions of coverage are formed by a scanning beam that scans between two region boundaries.

6. The position-finding system of claim 1 wherein the regions of coverage are formed by a scanning beam that scans in plannar fashion.

7. The position-finding system of claim 1 wherein the region of coverage of the position-finding device is reoriented relative to the self-propelled agricultural machine by at least one adjusting device when the detected guide variable moves to a region boundary of the region of coverage of the position-finding device.

8. The position-finding system of claim 1 further including at least one adjusting device for automatically orienting the regions of coverage of the position-finding device to center on the guide variables.

9. The position-finding system of claim 1 wherein the position-finding device is operatively rotatably mounted on the self-propelled agricultural machine and the position-finding device is swivellable relative to the self-propelled agricultural machine around a substantially vertical axis and wherein at least one adjusting device rotates the position-finding device.

10. The position-finding system of claim 1 wherein the guide variables are selected from the group consisting of: a standing crop edge, a swath, a furrow and an edge of a loading receptacle.

11. The position-finding system of claim 1 wherein at least one working parameter of the agricultural machine is adjustable at least partially in response to a position of the guide variable relative to the region of coverage detected by the position-finding device and in response to the orientation of the position-finding device relative to the self-propelled agricultural machine.

12. The position-finding system of claim 1 further comprising a second position-finding device and a second adjustment device, such that at least two guide variables may be sensed simultaneously.

13. The position-finding system of claim 1 wherein at least one of said position-finding devices is selectably oriented towards a first end of the agricultural machine and at least one other of said position findings devices is oriented toward a second end of said agricultural machine.

14. The position-finding system of claim 1 wherein the position of the guide variables relative to the position-finding device is detected by the position-finding device and used for automatically tracking the agricultural machine.

15. The position-finding system of claim 1 wherein the orientation of the working machine relative to the guide variable in a feed region of the self-propelled agricultural machine is detected by at least one position-finding device such that said orientation of said agricultural machine may be automatically tracked.

16. The position-finding system of claim 1 wherein automatic control of at least one adjusting variable of a transfer chute on the agricultural machine is at least in part determined according to said position-finding device sensing a guide variable.

17. The position-finding system of claim 1 wherein automatic coordination of a working vehicle is at least in part determined according to said position-finding device sensing a guide variable.

18. The position-finding system of claim 1 wherein said position-finding device is equipped with a navigation aerial.

19. The position-finding system of claim 1 wherein the position of the guide variables relative to the position-finding device, detected by the position-finding device, and the orientation of the position-finding device relative to the self-propelled agricultural machine in conjunction with the position of the position-finding device determined by a navigation aerial, at least in part controls a route for the agricultural machine.

20. The position-finding system of claim 1 wherein a reference orientation of the regions of coverage of the position-finding device is dependently predetermined by at least one adjustment of the self-propelled agricultural machine.

21. The position-finding system of claim 1 wherein the guide variables are automatically maintained within the region of coverage of the position-finding device.

22. The position-finding system of claim 1 wherein the agricultural machine is a combine harvester.

23. The position-finding system of claim 1 wherein the agricultural machine is a forage harvester.

24. The position-finding system of claim 1 wherein the agricultural machine is a towing machine.

* * * * *